US012786056B2

(12) United States Patent
Vasseur et al.

(10) Patent No.: US 12,786,056 B2
(45) Date of Patent: Nov. 3, 2026

(54) DYNAMIC ENABLEMENT OF REMOTE LANGUAGE MODELS ON STATIONS

(71) Applicant: Cisco Technology, Inc., San Jose, CA (US)

(72) Inventors: Jean-Philippe Vasseur, Saint Martin D'uriage (FR); Indermeet S. Gandhi, San Jose, CA (US); Jerome Henry, Pittsboro, NC (US); Pascal Thubert, Roquefort les Pins (FR); Robert E. Barton, Richmond (CA); Juan Carlos Zuniga, Montreal (CA); Federico Lovison, Fontanelle (IT)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 18/984,850

(22) Filed: Dec. 17, 2024

(65) Prior Publication Data

US 2025/0211483 A1 Jun. 26, 2025

Related U.S. Application Data

(60) Provisional application No. 63/614,518, filed on Dec. 22, 2023.

(51) Int. Cl.
*H04L 41/0816* (2022.01)
*G06N 3/08* (2023.01)
*H04L 41/16* (2022.01)

(52) U.S. Cl.
CPC ........... *H04L 41/0816* (2013.01); *G06N 3/08* (2013.01); *H04L 41/16* (2013.01)

(58) Field of Classification Search
CPC ........ H04L 41/0816; H04L 41/16; G06N 3/08
See application file for complete search history.

(56) References Cited

U.S. PATENT DOCUMENTS

2018/0167845 A1* 6/2018 Tang .................... H04W 28/06
2021/0160125 A1 5/2021 Cheng
(Continued)

FOREIGN PATENT DOCUMENTS

WO 2023059639 A1 4/2023

OTHER PUBLICATIONS

Ma J., et al., "Discussion on AIML Model Sharing Use Case in Federated Learning Scenario", doc.: IEEE 802.11-23-1349-00, Aug. 8, 2023, pp. 1-7.
(Continued)

*Primary Examiner* — Viet D Vu
(74) *Attorney, Agent, or Firm* — Patterson + Sheridan, LLP

(57) ABSTRACT

Techniques for improved network management and troubleshooting are provided. A set of packets are received, indicating, for each respective station of a set of stations associated to an access point in a network, machine learning support provided by the respective station. A textual diagnostic prompt relating to network conditions of the network is transmitted by the access point and to at least a first station of the set of stations. A textual response to the diagnostic prompt is received by the access point and from the first station, where the first station generated the textual response based on processing the textual diagnostic prompt using a first machine learning model. One or more network settings are modified based on the textual response.

20 Claims, 7 Drawing Sheets

(56) References Cited

U.S. PATENT DOCUMENTS

| | | | |
|---|---|---|---|
| 2022/0038349 A1 | 2/2022 | Li et al. | |
| 2022/0272001 A1 | 8/2022 | Mayor et al. | |
| 2022/0400373 A1 | 12/2022 | Zhu et al. | |
| 2023/0188409 A1 | 6/2023 | Wang et al. | |
| 2024/0028961 A1 | 1/2024 | Ali et al. | |
| 2024/0212140 A1* | 6/2024 | Mina | G06T 7/90 |
| 2025/0030688 A1* | 1/2025 | Oduwaiye | H04L 63/10 |

OTHER PUBLICATIONS

International Search Report and Written Opinion for International Application No. PCT/US2024/061788, mailed Mar. 20, 2025, 14 Pages.

RAPPORTEUR: "Experiential Networked Intelligence (ENI); Transformer Architecture for Policy Translation", ETSI GR ENI 030 V0.0.12, ETSI Draft; ENI(23)028_025, European Telecommunications Standards Institute (ETSI), 650, Route Des Lucioles; F-06921 Sophia-antipolis; France, vol. ISG ENI Experiential Networked Intelligence, Dec. 11, 2023, 51 Pages, XP014477703, Retrieved from ftp://docbox.etsi.org/ISG/ENI/05-Contributions/2023/ENI (23) 028_025 __ ENI_030v0012_Stable_Draft_Submission_.zip on Dec. 11, 2023, Clauses 4.5.2.1, 4.5.2.2, 4.5.2.8.

Wang H., et al., "Empowering ChatGPT-Like Large-Scale Language Models with Local Knowledge Base for Industrial Prognostics and Health Management", Arxiv.org, Cornell University Library, 201 Olin Library Cornell University Ithaca, NY 14853, Dec. 6, 2023, pp. 1-11, XP091817822, Sections III, III.A, III.B, III.D, IV.A, IV.B, Table II Figures 1, 2.

Wang S., et al., "Applications of Explainable AI for 6G: Technical Aspects, Use Cases, and Research Challenges", Arxiv.org, Cornell University Library, 201 Olin Library Cornell University Ithaca, NY 14853, Feb. 7, 2023, pp. 1-50, XP091434496, Sections I.A to I.C, II.A, IV.A, V.A, V.G figure 2.

* cited by examiner

DYNAMIC ENABLEMENT OF REMOTE LANGUAGE MODELS ON STATIONS

CROSS-REFERENCE TO RELATED APPLICATIONS

This application claims benefit of U.S. provisional patent application Ser. No. 63/614,518 filed Dec. 22, 2023. The aforementioned related patent application is herein incorporated by reference in its entirety.

TECHNICAL FIELD

Embodiments presented in this disclosure generally relate to computer networking. More specifically, embodiments disclosed herein relate to using machine learning to improve computer networks.

BACKGROUND

Troubleshooting and monitoring tasks are well known as being quite difficult to handle in modern computer networks, and particularly in large deployments. In some deployments, a variety of management frames (e.g., 802.11k measurements) can be used for access points (APs) to explicitly retrieve or request various radio frequency (RF) conditions and metrics, as seen or experienced by stations (STAs) in the network. However, these approaches are cumbersome and error-prone, and determining which metrics to log and/or trace remains an open issue when attempting to monitor and/or reconfigure the network. As such, the use of these requests remains limited to a relatively small subset of use cases and messages, and network conditions remain largely opaque.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
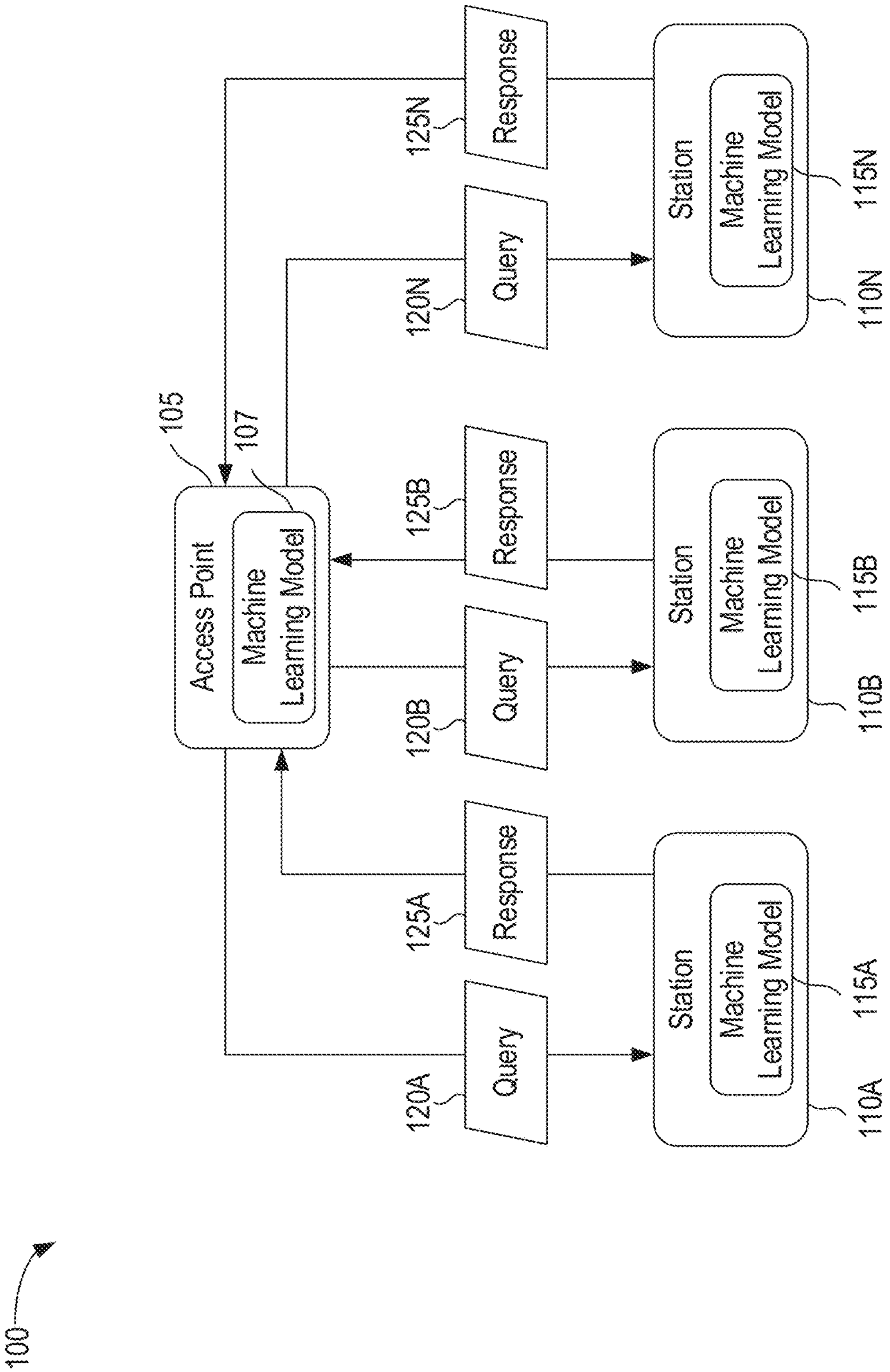
FIG. 1 depicts an example system for improved network management using remote language models, according to some embodiments of the present disclosure.

One embodiment presented in this disclosure provides a method, including receiving, by an access point (AP) and from a set of stations (STAs) associated to the AP in a network, a set of packets indicating, for each respective STA of the set of STAs, machine learning support provided by the respective STA; transmitting, by the AP and to at least a first STA of the set of STAs, a textual diagnostic prompt relating to network conditions of the network; receiving, by the AP and from the first STA, a textual response to the diagnostic prompt, wherein the first STA generated the textual response based on processing the textual diagnostic prompt using a first machine learning model; and modifying one or more network settings based on the textual response.

Example Embodiments

In some embodiments of the present disclosure, techniques are provided to train and/or use machine learning models (e.g., language models) to jointly facilitate network management in computer networks.

In some embodiments, machine learning model architectures (such as large language models (LLMs)) can be used to accomplish or perform a variety as tasks, such as storing information in a knowledge database, using an agent to execute instructions provided by LLM, and the like. In some embodiments, LLM-based troubleshooting and monitoring (LTM) can leverage local inference of language models (e.g., LLMs) on remote agents (e.g., STAs), rather than requesting that the STA provide information about specific metrics and/or events that may be difficult or impossible to predict or identify. That is, rather than requesting specifically identified information about particular RF factors or other information, the AP(s) may provide more generic instruction or requests, allowing the STA to determine how best to respond (e.g., using a local LLM).

As used herein, an AP may generally refer to any networking device used to enable or facilitate wireless communication in a wireless network, such as a wireless local area network (WLAN) (e.g., a WiFi network). For example, some operations described with reference to the AP may be performed by other network devices, such as wireless LAN controllers (WLCs) in some embodiments. Further, as used herein, a STA may generally refer to any computing device capable of communicating using the wireless network. For example, a STA may correspond to a smartphone, a laptop, a desktop computer, a tablet, a wearable device, an Internet of Things (IoT) device, and the like.

In some embodiments, one or more STAs in a network may advertise (e.g., to the AP(s)) the capabilities of the STA with respect to machine learning. For example, in the context of model sharing and/or LTM, APs and STAs may exchange post-association packets (e.g., action frames) that characterize the type(s) of artificial intelligence (AI) and/or machine learning (ML) support that is (or are) implemented on each system. In some embodiments, for example, the action frame(s) may include information elements (IEs) that express AI/ML capability elements such as the amount of available memory and central processing unit (CPU) time for AI and/or ML (e.g., for LTM). Generally, "available memory" refers to the memory that is available to run a local AI/ML engine (e.g., an LLM), and "available CPU" may refer to the number or percentage of clock cycles that could be assigned to the AI/ML process. In some embodiments, the frame may also indicate the type(s) of model(s) that the STA and/or AP support, such as whether they support LLMs, the base LLM from which the model executed by the device was derived, and the like. In some embodiments, the AP and STA may similarly indicate which dataset(s) the local model(s) were trained on, providing an indication of the model's performance and focus.

In some embodiments, the central LTM component (e.g., hosted on the AP and/or a WLC) can use this ML support information from the STA(s) to drive management of the network. For example, in some embodiments, the troubleshooting process may be highly distributed and non-symmetrical in common deployments (e.g., where the AP(s) and STA(s) may have substantially different "views" of the network conditions). Therefore, in some embodiments, the AP (or other managing entity) may first seek to determine a set of STAs (e.g., the minimum set) that is hosting (or is capable of hosting) a remote machine learning model (e.g., an LLM) and that should be queried in order to provide a useful view of the network.

In some embodiments, the set of candidate STAs can be determined according to the node capabilities (e.g., advertised as discussed above). In some embodiments, once the set of candidates has been determined, the AP may transmit a new action frame to each selected STA (e.g., each STA running the LLM of choice). In some embodiments, this action frame may include a natural language query (e.g., a textual diagnostic prompt) relating to the network conditions and/or querying the STA's LLM for some diagnosis. In some embodiments, as discussed in more detail below, the AP may generate this prompt using its own machine learning model (e.g., an LLM). In some embodiments, the AP's LLM may be pre-trained for prompt optimization based on the structure and/or configuration of the selected remote LLM(s), as discussed in more detail below.

In some embodiments, the AI/ML LLM query action frame contains a query field which is an open string structure where a question can be asked. In some aspects, the question may be a full natural language sentence (e.g., "why have you been experiencing modulation coding scheme (MCS) degradation over the last five seconds?"). In some embodiments, the question may be an abbreviated or shortened natural language string (e.g., to reduce the size of the frame) (e.g., "why MCS degradation last 5 s?").

In some embodiments, the query is more structured, and may contain one or more IEs to classify the type of question (e.g., "subtype MAC header", or "subtype FCS") before the question field itself (e.g., "why failures last 5 s?"). In some embodiments, in a similar to the AI/ML LLM query from the AP to the STA(s), the AI/ML LLM response (from the STA(s) to the AP) can be used to carry the reply from each STA. In some embodiments, similarly to the query, the response frame may be a flat or open text field (e.g., allowing the insertion of a reply such as "AP beacons were lost while AP RSSI stayed stable"). In some embodiments, the response may also include qualifying IEs before the response field itself (e.g., "subtype RSSI"+"stable", "subtype beacons"+"not received").

In some embodiments, the AI/ML query and response may be a dialog between the AP and STA, with more than one exchange. Additionally, in some embodiments, the AP may retrieve advanced diagnosis information via LLM exchange with some STAs, while retrieving raw metrics through other action frames from other STAs (e.g., that that are not able to engage in LLM exchange, or that host LLMs that do not match the AP's LLM requirements), as discussed in more detail below.

In some embodiments, the AP (or another entity) may determine whether additional models should be trained (e.g., on the AP side) in order to satisfy any relevant STA constraints (e.g., to train a new model or reconfigure the model size of the AP to match the STA's memory constraints). For example, models with fewer parameters may be trained on and/or for the AP, or quantization techniques may be used to lower the memory constraints. Such tradeoffs may be determined by the central engine capable of training models that would meet the STA requirements without over-compromising efficiency. In some embodiments, as more STAs join the network, the AP can learn the typical LLM structures of the networked STAs, and may progressively modify the trained model used by the AP to match (or at least become more similar to) the structure of the STA's LLM(s). In this way, the AP LLM may learn and adapt how it generates requests in order to target the particular LLM capabilities of the clients.

FIG. 1 depicts an example system 100 for improved network management using remote language models, according to some embodiments of the present disclosure.

In the illustrated example, an AP 105 and a set of STAs 110A-N (collectively, STAs 110) are communicatively linked in a wireless network (e.g., a WLAN). Although a single AP 105 is depicted for conceptual clarity, there may be multiple APs in the deployment. Further, although not depicted in the illustrated example, the network may include and/or be managed by one or more other components, such as wireless controllers. Similarly, although three STAs 110 are depicted, the network may generally include any number and variety of STAs 110.

As discussed above, the AP 105 is generally representative of a network device that facilitates, manages, and/or provides wireless communication via the network. For example, the AP 105 may schedule or otherwise coordinate transmissions to and from each STA 110. Each STA 110 is generally representative of a networked device capable of communicating via the network, such as a smartphone, a tablet, and the like.

In the illustrated example, the AP 105 hosts a machine learning model 107. That is, the AP 105 may execute the machine learning model 107 locally (e.g., on its own hardware) or may access the machine learning model 107 on a second system (e.g., a controller). The machine learning model 107 may generally use a variety of architectures. In some embodiments, the machine learning model 107 is a generative model that generates textual (e.g., natural language) output. For example, the machine learning model 107 may be a language model (e.g., an LLM).

Further, in the illustrated example, each STA 110A-N hosts a respective machine learning model 115A-N. That is, each STA 110 may execute a local machine learning model 115 (e.g., on its own hardware) or may access the machine learning model 115 on a second system. The machine learning models 115 may generally use a variety of architectures, and may or may not have matching architectures and configurations. In some embodiments, the machine learning models 115 are generative models that generate textual (e.g., natural language) output. For example, the machine learning models 115 may represent a variety of language models (e.g., LLMs).

In some embodiments, the machine learning model 107 and the machine learning models 115A-N are diagnostic language models. That is, the models may be trained to assist in diagnosing or evaluating network conditions and configurations using natural language. For example, in some embodiments, the machine learning model 107 of the AP 105 may be used to generate textual prompts to assist investigation of network issues. As one example, the AP 105 may provide, as input to the machine learning model 107, information such as what specific issue(s) are being investigated, what STA(s) 110 are to be queried, and the like. The machine learning model 107 may process this input to generate a textual string as discussed above. For example, if the AP 105 is troubleshooting packet loss at a given STA 110, the machine learning model 107 may output one or more sentences such as "why packet loss last minute?" That is, rather than requesting specific and granular raw data (e.g., a buffer status report, a signal strength report, and the like), the AP 105 may ask a broader question, allowing the STA 110 to determine how best to respond.

In the illustrated example, the AP 105 may transmit one or more queries 120A-N to one or more STAs 110 to perform this network management. For example, as discussed above, the query 120A may inquire as to why packets are being lost. In some embodiments, as discussed in more detail below, the query 120 sent to a given STA 110 may be personalized or targeted based on the STA 110 that will receive it (e.g., based on the capabilities of the STA 110, the position of the STA 110 in the network, the version of the machine learning model 115 hosted by the STA 110, and the like).

As illustrated, each STA 110 that receives a query 120A-N may process the textual prompt using its local machine learning model 115. For example, as discussed above, the query 120 may include a relatively high level question regarding the network conditions, and the STA 110 may process the question using its local machine learning model 115 to determine how to best respond. As one example, if the query asks why packets are being dropped or lost, the machine learning model 115 may determine that the relevant conditions include the perceived signal strength at the STA 110, the buffer status of the STA 110, and the like.

As illustrated, based on this evaluation, each STA 110 may generate a corresponding response 125A-N. In some aspects, the response 125 may similarly include a textual string (e.g., a natural language sentence) as a response to the query 120. For example, the response 125A from the STA 110A may include "buffer is full" or "signal strength fluctuating and low," or any other information that may indicate the cause of the detected network issues.

As one example workflow, consider a situation where the central machine learning model 107 hosted on the AP 105 is asked to troubleshoot a global performance issue for the network. In this distributed mode, the central machine learning model 107 may trigger a series of steps, such as first identifying the set of STAs 110 hosting a remote machine learning model 115, and selecting the best candidates (e.g., based on their RF characteristics, position in the basic service set (BSS), the structure of the machine learning model(s) 115 they run, and the like). The AP 105 may then relay the question or query 120 (e.g., using an LLM query action frame, or a series of action frames in a dialog) to the selected STA(s) 110. In some embodiments, as discussed above, the central engine may not simply relay the request in full, but may generate a more concise prompt for one or more of the remote machine learning models 115, (e.g., more adapted to the nature of the remote model), as described above.

In some embodiments, the machine learning model 107 may also be used to identify potential blind spots (e.g., where there are no remote machine learning models 115, or no machine learning models 115 that are able to adequately respond, in a given segment of the BSS). In some embodiments, as discussed above, the AP 105 may therefore request one or more raw metrics from STA(s) 110 in these conditions, rather than using natural language text requests.

In some embodiments, once the responses 125 (and potential raw metrics, in some embodiments) are received, the central machine learning model 107 may continue the troubleshooting request based on processing the received responses 125 and/or the AP's 105 current view of the network as input. This allows the machine learning model 107 to diagnose concerns and implement modifications to the network settings or configurations in order to remedy the concerns.

In some embodiments, as discussed above, the AP 105 can take various steps to improve this information exchange, such as through pre-caching of relevant context, generating specific textual requests for specific STAs 110, and the like.

For example, in some embodiments, the AP 105 may identify the most common tasks or issues that are evaluated using the central LLM. For example, the AP 105 or another management component may evaluate a sorted list of reported issues over a period of time. The AP 105 may then determine the associated set of most common tasks for troubleshooting and monitoring each of these most common issues (e.g., the top N issues).

In some embodiments, for each of these tasks, the AP 105 may store relevant information from the past efforts. For example, for each question (or category of questions), the AP 105 may record the set of actions that were performed in the past that lead to successful mitigation of the concerns (e.g., where the agent managed to succeed in accomplishing the task). In some embodiments, the AP 105 may further record any required information that was retrieved from the knowledge database (e.g., by the AP 105 and/or by the STA(s) 110) to solve the issue.

In some embodiments, the model prompt comprises the task (e.g., the original question), additional information (such as the set of documentations or methods useful to answer the question), and/or any additional reasoning instructions, and the AP 105 may record these prompt(s) that allowed the problem to be diagnosed and corrected (e.g., the prompts to the machine learning model 107 and/or to the machine learning model(s) 115). For example, in some embodiments, the AP 105 may record the information that was obtained from the STA(s) 110 (e.g., via the responses 125). In some embodiments, the machine learning model 107 may further record or generate a usefulness score for each response 125, indicating how useful the response was in contributing to solving issue.

As another example, the AP 105 may store records indicating, for each machine learning model 115 hosted on remote STAs 110, and/or for each question (or category of questions), the set of actions that were performed in the past leading to success and/or required retrieved information from the knowledge database. For example, the AP 105 may store a record of the query (or queries) that were sent to each STA 110, in order to learn how to phrase new queries to improve the probability of success. Advantageously, by storing such information related to previously successful attempts to reconfigure the network, the AP 105 can refine the machine learning model 107 and/or use this context as input or condition to the machine learning model 107 in order to allow the machine learning model 107 to generate improved output prompts that are more likely to solve future problems.

In some embodiments, the AP 105 may use this information to determine the best strategy for each STA 110 in light of the relevant constraints. For example, the AP 105 may seek to reduce the network load (e.g., though each prompt for the machine learning model 107 may be fairly large as discussed above, the AP 105 may seek to minimize the size of the query 120 sent to the STA(s) 110 while maximizing the utility function of the response(s) 125). That is, the machine learning model 107 may be used to generate a concise and targeted textual string for the particular STA 110 (e.g., for the particular machine learning model 115 used by the particular STA 110) to improve the probability that the problem can be solved with minimal network overhead.

As another example, the AP 105 may evaluate the memory available on the STA(s) 110. If sufficient memory is available, in some embodiments, the AP 105 may decide to send any required or relevant contextual information to the STA 110, allowing the STA 110 to store the information locally for at least the most commonly asked question. That is, the AP 105 may, prior to transmitting a diagnostic prompt to the STA 110 (e.g., at association), determine the common network issues, identify the relevant contextual data for these issue(s), and transmit this contextual data to the STA 110 to be cached or stored.

Such an optimization may allow the AP 105 to transmit the question itself (without including further contextual data such as documentation) when the common issue(s) arise. For example, in some embodiments, after association and while the STA 110 is idle, the AP 105 may select one or more common issues and begin providing the target STA 110 with contextual data and/or pre-prompts relevant to the (one or more) common issues in the network (e.g., "common issue roaming failure—requires initial AP last RSSI before roam, target AP first RSSI at roam time, timestamp of last successful frame on previous AP, . . . "). In some embodiments, the STA 110 can store these queries and the associated contextual information.

Subsequently, once an issue actually occurs, the AP 105 may select or prioritize the STA(s) 110 that were pre-fed with contextual information and/or pre-prompts about the issue. This can allow the AP 105 to generate and use very compact prompts to finish characterizing the query (e.g., "why roaming failure?").

In some embodiments, the AP 105 may also evaluate information such as the CPU available on each STA 110. For example, if a STA 110 has available CPU to execute more complex and/or larger models (e.g., which may be trained using a larger dataset), these STAs 110 may require less contextual data to be locally retrieved or provided explicitly in order to generate adequate responses.

In some embodiments, taking into account all such constraints and capabilities, the AP 105 can intelligently store information at the edge of the network (e.g., on the STA(s) 110) in order to allow for less network load (e.g., systematically passing a large amount of data) for every issue encountered, while also maintaining a sufficient level of accuracy. For example, for questions that are not commonly asked, it may be acceptable to send all of the required information on-the-fly, but for common issues it may be preferable to pre-cache the relevant context.

In some embodiments, the storage of information remotely (on the STA(s) 110) is a dynamic process. For example, the AP 105 may determine that information previously provided to the STA(s) 110 has become obsolete or is no longer required or relevant. In some embodiments, the AP 105 may therefore transmit a suggestion or instruction to the STA 110 to remove the previously cached information. Similarly, the AP 105 may transmit new information (e.g., for new questions, or because the efficacy of the remote machine learning model 115 has declined) to improve future responses.

In some embodiments, in addition to pre-caching and other steps to improve results, the AP 105 may retrain or refine its own machine learning model 107, or may access different or new machine learning models, based on the capabilities of the STA(s) 110. For example, the AP 105 may evaluate differences between the machine learning model 107 used by the AP 105 and the machine learning model 115 used by one or more STAs 110 (e.g., differences in version, base model, size, training data, and the like). Based on the differences, the AP 105 may select or use a different machine learning model that is better-matched with the model used by the STA(s) 110. For example, the AP 105 may determine to use a model having the same base model, similar model size, and/or trained on the same dataset in order to improve the probability that the STA 110 will understand and accurately respond to the prompt.

In these ways, the system 100 can use local and remote machine learning models to significantly improve the network management and remediation processes. For example, as discussed above, the use of machine learning models (e.g., LLMs) allows for the sharing of elements that are not standardized (in addition to, in some embodiments, some exchanged elements can be standardized, such as management information base (MIB) variables). For example, a natural language phrase such as "RF conditions" can include a large number of metrics (e.g., more than a dozen parameters). Therefore, this short phrase can be used as a more compact way of exchanging or requesting information (e.g., rather than listing each variable desired). Further, some chipsets (e.g., some STAs 110) may include additional useful elements under this term, which would not otherwise be a standardized variable or request, but that would still be useful. Using language models such as the machine learning model 115, the STAs 110 can include this information even without explicit request.

In some embodiments, however, use of more general terms can cause confusion (e.g., wrong interpretation on either side). Additionally, the information exchange is often intended to improve network performance. When performance degrades, it may be too late to start sending large prompts. Therefore, use of pre-cached information transmitted at the beginning of the connection (while no problems are reported, while the STA 110 is not exchanging a large amount of traffic, and the like), allows for the STA 110 and the AP 105 to have a common technical basis of exchange. When a performance issue arises, the AP 105 and STA 110 can thereby still use compact natural language to refer to elements that were already agreed upon (and exchanged).

Although not depicted in the illustrated example, in some embodiments, the AP 105 may further use the reported support and capabilities of the STAs 110 to improve or provide federated learning (e.g., joint training of machine learning models).

Generally, in a federated learning embodiment, a central entity (e.g., the AP 105 or some system behind the AP 105, such as a controller) generates the model structure (e.g., a neural network). The structure may include hyperparameters (e.g., number of layers, nodes, activation functions in each layer, epoch duration, step size, and the like). In some embodiments, the STA(s) 110 in the network may advertise their AI/ML capability as discussed above. In some embodiments, the STA(s) 110 may further advertise their AI/ML model sharing capability.

For example, after association, an action management frame may be transmitted from the AP 105 to query the STA 110 about its computing capability, such as asking if the client supports parallel processing (e.g., using GPU(s)) that can be used for AI tasks, such as training or inference. The STA 110 may reply with an AI/ML shared model computation action frame indicating the type(s) and capabilities of resources available on the STA 110 for shared model computing or training, such as the resource type (e.g., which type of processing cores are available) and/or how many cores are available for parallel processing.

In some embodiments, the AP 105 can transmit a query frame asking whether a given STA 110 is capable of supporting a specified architecture (e.g., a certain number of layers and/or neurons). In some embodiments, the STA 110 may accept, decline, or suggest a counter proposal (e.g., indicating how many layers and/or neurons the STA 110 can support). In some embodiments, this training capability exchange allows the wireless network to ascertain how many parallel cores are available on the STA(s) 110 for federated learning.

In some embodiments, the AP 105 can then send a model component proposal to the participating STA(s) 110. For example, the proposal may include a problem definition IE, a task index (e.g., if the AP distributes more than one model request), one or model definition IEs, and the like. In some embodiments, the problem definition IE defines the goal of the prediction. In some embodiments, the goal may be abstract and/or not shared with the STAs 110 (e.g., the IE is either null, or contains a reserved value). In some embodiments, the goal may be to predict the best values for some metrics that the STA 110 can understand. In some embodiments, the IE may include one or more MIB entries matching the prediction target (e.g., dot11TI Threshold, or the best RSSI threshold below which the channel is considered idle and OBSS transmissions are ignored). That is, the model may be a diagnostic model intended to be federally (e.g., jointly) trained and then used (by the AP 105 and/or the STAs 110) to manage the network, as discussed above.

In some embodiments, the model definition IE can include the basic form of the model, parameters or inputs that are expected as input to the model, the activation functions expected for each layer, and other hyperparameters. In some embodiments, depending on the resources available on the STA 110, the AP 105 may adapt the size and/or structure of the model to fit the capabilities of the STA(s) 110. For example, if the STA 110 can only support a model with five hundred parameters, the AP 105 may deploy an adapted model (or portion thereof) according to what the STA 110 can handle. For example, the AP 105 may partition the network into smaller subnets and transmit or allocate these subnets (e.g., a subset of the total number of neural network units) to the participating STA(s) 110 based on their capabilities.

In some embodiments, after some time spent training, a given STA 110 may be ready to share results with the AP 105. That is, each STA 110 may train a local model (or partition thereof) on their own local data. In some embodiments, at intervals, the AP 105 may query for training updates (e.g., using an action frame). The STA(s) 110 may reply with a training update report. For example, the report may optionally include a task index, a computation report that includes the training sample size, the number of epochs completed, the overall computation time, and the like.

In some embodiments, following the training update query, the AP 105 can decide whether any of the STA(s) 110 should continue the training task, or whether any of the STA(s) 110 are ready to share results. In some embodiments, if the AP 105 determines that a given STA 110 should continue its training, the AP 105 may transmit a training update report that indicates a training target (e.g., "stop after N epochs").

In some embodiments, for any STA(s) 110 ready to share results, the AP 105 may transmit a model training update action frame. In response, the STA 110 may then generate a model update action frame and transmit this frame to the AP 105. In some embodiments, the model update action frame comprises a matrix that includes the weights that the STA 110 computed for the relevant neural network units. In some embodiments, the response can also include an additional IE specifying the hyperparameters (e.g., number of epochs, sample size, floating precision, and the like) that the STA 110 was using. In some embodiments, if the training update request from the AP 105 is specific (for example "Layer 3"), the STA 110 response may include only the requested weights.

In some embodiments, model updates provided by the STAs 110 can be compressed. For example, the AP 105 may specify a quantization scheme (e.g., what precision or bitwidth should be used to encode the parameters). In some embodiments, the STA 110 may send an initial quantized version of the updated model, and the AP 105 may evaluate the model (e.g., using test data) and to decide whether the model is sufficient or not. If higher precision quantization is desired, the AP 105 can transmit, to the STA 110, a continuation request, causing the STA 110 to send a new update (e.g., including the full-precision unquantized values).

In some embodiments, the AP 105 can aggregate the updates from each STA 110 and/or neighboring APs using functional splitting (e.g., where non-linear layers can be merged centrally while convolutional layers can be combined in a decentralized manner). In some embodiments, the AP 105 may periodically share the aggregated global model to participating STAs 110 using multicasting (or individual updates). STAs 110 may then optionally adopt the updated model for (as their new machine learning model 115) for future diagnostics, and/or for the next local training iteration. In some embodiments, each STA 110 may alternatively or additionally query the AP 105 for a model sharing update. As above, the AP 105 can then send the model parameters, along with any relevant hyperparameters.

Figure 2:
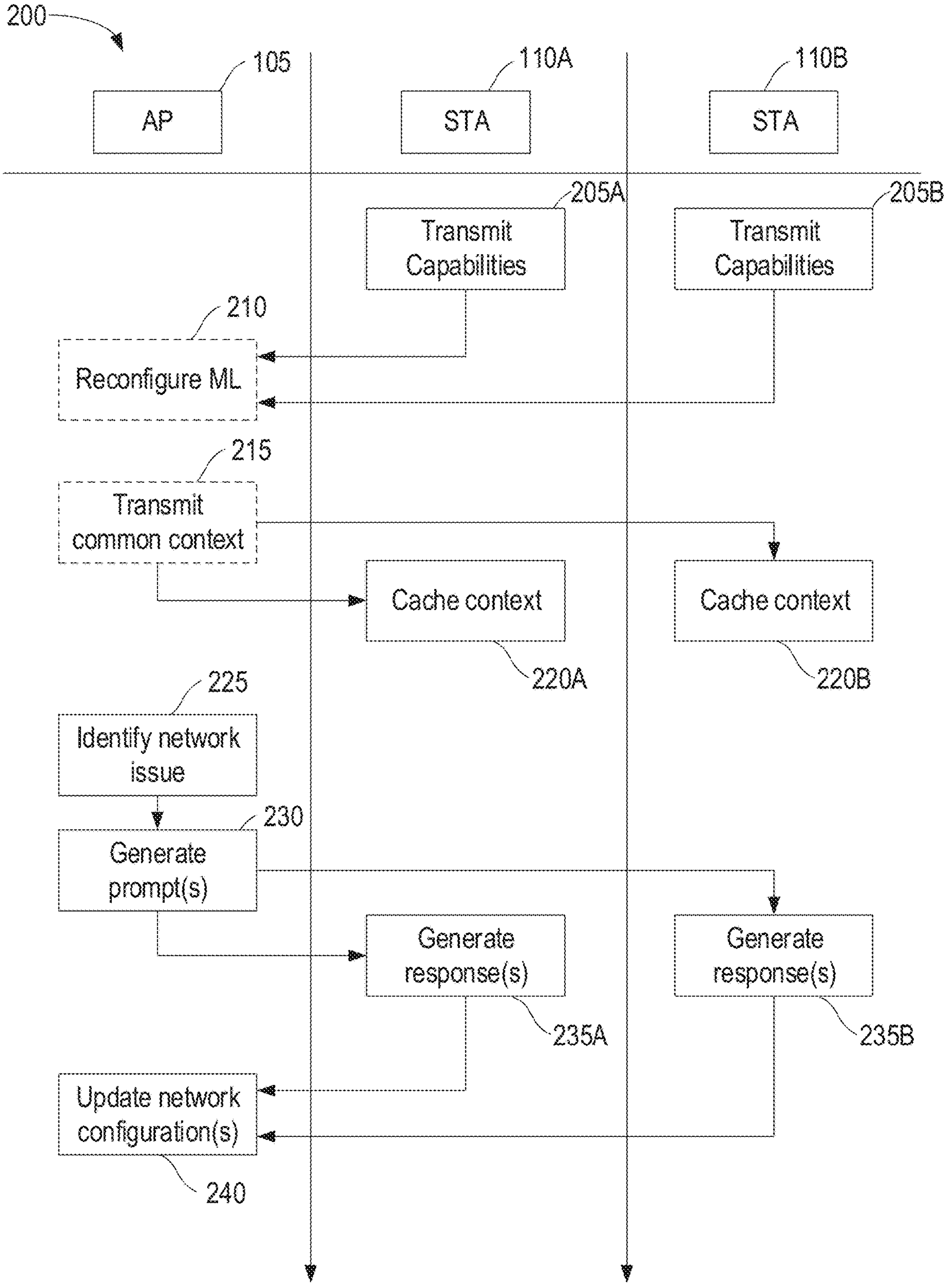
FIG. 2 depicts an example call flow for improved network management using remote language models, according to some embodiments of the present disclosure.

FIG. 2 depicts an example call flow 200 for improved network management using remote language models, according to some embodiments of the present disclosure.

In the illustrated example, operations performed by an AP 105 and two STAs 110A and 110B are depicted. As discussed above, although the illustrated example depicts one AP 105 and two STAs 110, the network may include any number of APs 105 and STAs 110, as well as any other relevant network systems (e.g., controllers).

In the illustrated call flow 200, each STA 110 transmits an indication of its capabilities at blocks 205A and 205B. For example, after association (e.g., after joining the network), a STA 110 may transmit an action frame indicating the machine learning support provided by the STA 110. As discussed above, this capability information may include describing or indicating the particular model(s) (e.g., the LLM) that the STA 110 is hosting, the training data used (e.g., whether the model was trained using any specific training dataset, such as one or more networking-related datasets), and the like. In some embodiments, as discussed above, this support may indicate the capacity of the STA 110 to engage in federated learning, such as by indicating the number of core(s) available for training, indicating the amount of memory available for training, indicating the number of neural network units (e.g., the number of neurons) that the STA 110 can support and train, and the like.

Although the illustrated example depicts each STA 110 transmitting this capability information to the AP 105 without request, in some aspects, the STA 110 may transmit this information in response to a request, from the AP 105, to indicate the capabilities of the STA 110. Further, although the illustrated example depicts both STAs 110 indicating various machine learning capabilities, in some embodiments, one or more STAs may indicate a lack of such capacity. For example, the STA 110 may transmit an action frame indicating that the STA 110 does not (or cannot) host a diagnostic model, that the STA 110 cannot participate in training, and the like. In some embodiments, rather than sending an explicit indication of this lack of support, the AP 105 may interpret silence from the STA 110 as indicative of lack of support. That is, if the AP 105 transmits a request for information relating to the machine learning support offered by the STA 110 and the STA 110 does not return a response, the AP 105 may infer that the STA 110 lacks such capabilities.

As illustrated, at block 210, the AP 105 can optionally reconfigure its own ML capabilities based on the capabilities offered by the STAs 110. For example, as discussed above, the AP 105 may evaluate any differences between its own support (e.g., the model(s) the AP 105 hosts) and the support offered by one or more of the STAs 110 (e.g., the model(s) the STA 110 hosts), and may determine to switch to a different architecture or model (e.g., to align with the model used by the STA(s) 110). For example, to reduce the probability of miscommunications or misunderstandings, it may be beneficial for the AP 105 to use the same (or a similar) model when generating the prompt(s) as the STA(s) 110 will use when interpreting the prompts to generate a response (e.g., the same architecture, a model with a similar number of parameters, a model trained on the same dataset(s), and the like). In some aspects, the AP 105 may host multiple models, and may select the particular model to use when generating a given prompt based on the STA(s) 110 that will receive the prompt. For example, the AP 105 may, for each STA 110 that will be prompted, select and use a corresponding model to generate the corresponding prompt.

At block 215, the AP 105 can optionally transmit common contextual information to one or more of the STAs 110. For example, as discussed above, the AP 105 may identify one or more common issues (e.g., the N issues that arise most frequently in the network for which the AP 105 requests information from the STA(s) 110 to remedy). The AP 105 can then determine any relevant context that the STAs 110 may use to respond to the AP's prompting (e.g., current configurations of the network that may be relevant). In the illustrated example, rather than sending this contextual information when the issue arises, the AP 105 can optionally transmit some or all of this context to the STA(s) 110 before the issue is identified (e.g., at association time). As illustrated at blocks 220A and 220B, each STA 110 may cache this context (e.g., store the context in a local memory), allowing it to be retrieved and used to generate future responses.

At block 225, the AP 105 identifies a network issue in the network. Generally, the network issue may include a wide variety of management or troubleshooting concerns, including connectivity issues, latency concerns, congestion concerns, and the like. Generally, the network issue may relate to any device or system in the network, including the AP 105, one or more STA(s) 110, and the like. Identifying the network issue include identifying an active issue (e.g., a STA 110 has stopped responding), determining to probe or evaluate the network generally (e.g., periodically evaluating congestion), and/or any other evaluation, monitoring, or management function in the network.

At block 230, the AP 105 generates one or more prompts in response to the identified issue. In some embodiments, as discussed above, the prompt(s) may generally include textual strings or requests (e.g., natural language questions or inquiries) to investigate, mitigate, or otherwise monitor or manage the issue. For example, as discussed above, the prompt may include a phrase such as "why are you having connectivity issues?" or "why did that roaming event fail to complete?" In some embodiments, as discussed above, the AP 105 may generate the prompt(s) using machine learning (e.g., by processing the issue and any relevant context using an LLM). For example, the input to the model may include an indication that a specific STA 110 failed to transfer to a second AP in the network, along with various contextual information about the AP(s) involved, the STA involved, and the like. In response, the model may generate an output phrase to inquire as to why the roam failed.

In some embodiments, as discussed above, the AP 105 may identify a subset of the STAs 110 to which the prompt should be sent. That is, depending on the particular issue identified, the affected STAs 110, the capabilities of each STA 110, and the like, the AP 105 may select one or more STAs 110 to be prompted. In some embodiments, as discussed above, the AP 105 may generate a unique or targeted prompt for each STA 110. For example, the AP 105 may select and/or generate a given prompt based on identifying a stored record indicating that the given prompt previously solved the issue (e.g., the prompt resulted in a prior response from the STA 110, which caused the AP 105 to implement one or more modifications, which then improved network conditions or solved the issue). Generally, as discussed above, the AP 105 may learn to generate targeted prompts over time (e.g., by refining the local model(s) based on prior prompts and responses). In some embodiments, as discussed above, the prompt may include contextual information relevant to the issue (if such information has not already been provided by the AP 105, such as at block 215).

As illustrated in blocks 235A and 235B, after receiving the prompt(s), each STA 110 may generate a response. For example, as discussed above, the STA 110 may process the prompt (which may include natural language text and/or any relevant contextual information) using a local machine earning model (e.g., an LLM). The model may interpret the prompt to determine what the request is asking, what data may be relevant, and the like. For example, if the prompt asks about recent retry rates increasing, the STA 110 may identify relevant context affecting retry rates, such as the perceived signal strength of the network by the STA 110, whether packet collisions occurred, and the like.

In some embodiments, the STA 110 may use the machine learning model to generate a textual response based on this context. For example, the STA 110 may generate a response such as "signal strength low and intermittent." As illustrated, each STA 110 may transmit this response back to the AP 105.

At block 240, the AP 105 can then update or modify one or more settings or configurations in the network, based on the responses, in an attempt to remedy or mitigate the issue.

For example, as discussed above, the AP 105 may take actions such as adjusting transmission power, modifying the scheduling used to allocate resources in the network, suggest the STAs 110 take actions such as roaming to another AP, and the like. Generally, at block 240, the AP 105 (or a controller of the network) may perform any suitable management action. In some embodiments, to determine which action(s) to take, the AP 105 may process the response(s) using a machine learning model (e.g., the LLM), as discussed above. For example, the model may be used to evaluate the potential causes indicated in the response(s), and identify corresponding mitigations that can be used.

Figure 3:
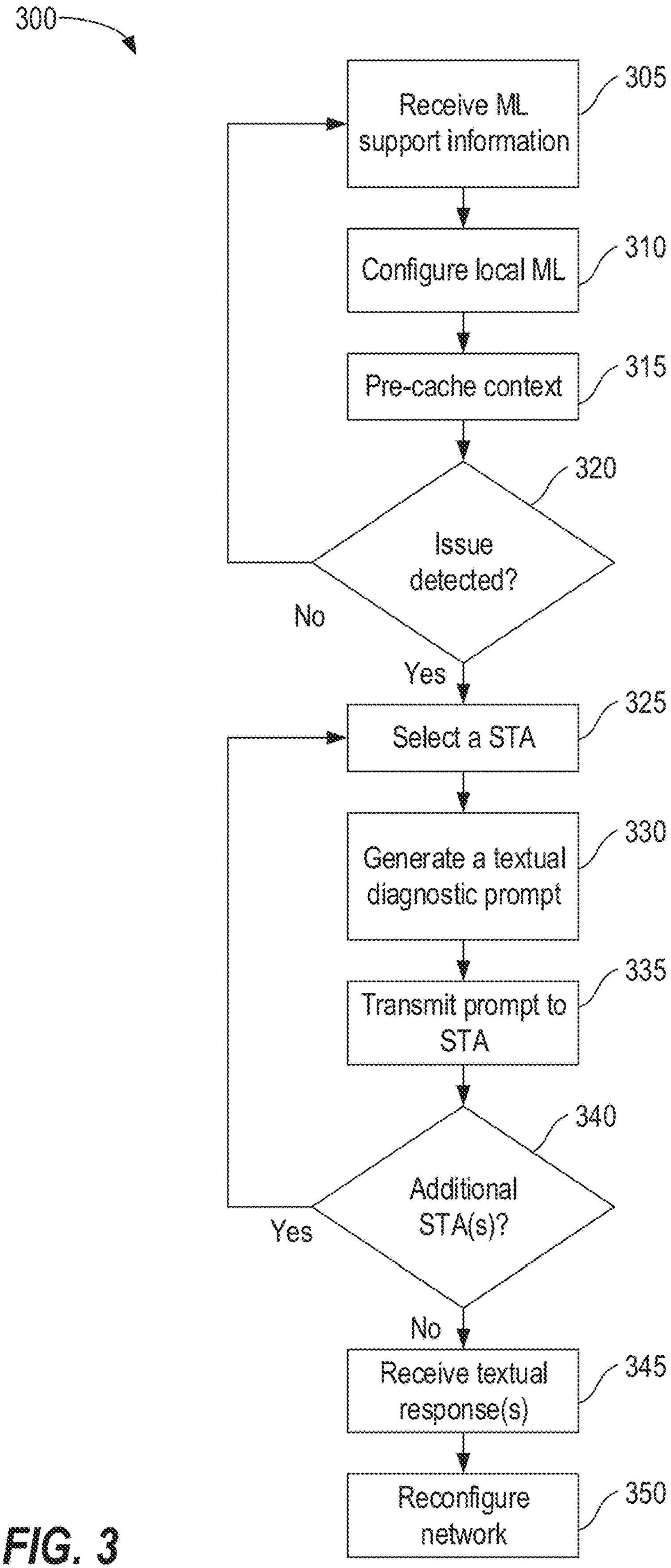
FIG. 3 is a flow diagram depicting an example method for improved network management using remote language models, according to some embodiments of the present disclosure.

FIG. 3 is a flow diagram depicting an example method 300 for improved network management using remote language models, according to some embodiments of the present disclosure. In some embodiments, the method 300 is performed by an AP, such as the AP 105 of FIGS. 1-2.

At block 305, the AP receives ML support information from one or more STAs. For example, as discussed above, the AP may request that each STA, at association, indicate the ML support offered by the STA (e.g., which model(s) the STA hosts or can host, what computing resources are available for federated training of diagnostic models, and the like).

At block 310, the AP may configure its local ML based on the support offered by the STA(s), as discussed above. For example, the AP may determine to use a particular model, at least when generating prompts for the specific STA, to ensure that the prompts or queries are generated using a similar model to the model used by the STA. This can improve the probability that the requests are accurately understood by the STA.

At block 315, the AP optionally pre-caches contextual information on the STA. For example, as discussed above, the AP may identify commonly used contextual information for the network (e.g., context that is often used when diagnosing and/or solving the most common network issues), and may offer or instruct the STA to cache the relevant context for future use (if sufficient resources are available).

At block 320, the AP determines whether an issue has been detected in the network. If not, the method 300 returns to block 305 to continue receiving updated information and/or pre-caching context for new STAs and/or for already-associated STAs, as relevant.

If, at block 320, an issue is detected, the method 300 continues to block 325. At block 325, the AP selects a STA to which a diagnostic prompt or query should be sent, in response to the identified network issue. In some embodiments, as discussed above, the AP can select the STA based on a variety of criteria, including inferring whether the STA is likely to have useful information (e.g., whether the issue relates to the STA or a portion of the network that the STA occupies), whether the STA is capable of responding (e.g., whether the STA hosts a sufficient model to respond to the query), and the like.

At block 330, the AP generates a textual diagnostic prompt, based on the issue, to be transmitted to the STA. In some embodiments, as discussed above, the prompt may also be generated based on other information, such as context related to the issue (e.g., the current network configurations and/or characteristics), the identity of the STA that will receive the prompt, and the like. In some embodiments, as discussed above, the AP generates the prompt using a local machine learning model (e.g., an LLM).

In some embodiments, as discussed above, generating the prompt may include identifying and including relevant contextual information to assist in answering the request. For example, the AP may include relevant network configuration information, or may determine whether the STA already has the relevant context cached locally (as discussed above).

At block 335, the AP transmits the prompt to the selected STA. The method 300 then continues to block 340, where the AP determines whether to transmit a prompt to one or more additional STAs. If so, the method 300 returns to block 340. If not, the method 300 continues to block 345. Although the illustrated example depicts a sequential process (e.g., generating and transmitting prompts to each STA in sequence), in some embodiments, the AP may generate and/or transmit some or all of the prompts entirely or partially in parallel. Further, although the illustrated example depicts generating a respective prompt for each STA, in some embodiments, the AP may reuse one prompt for two or more STAs.

At block 345, the AP receives one or more textual responses from each prompted STA. As discussed above, each STA may generate the response by processing the textual prompt (and relevant context, in some aspects) using a local model (e.g., an LLM) hosted by the STA.

At block 350, the AP can reconfigure the network (e.g., adjusting or modifying configurations, settings, preferences, and the like) based on the textual responses. For example, as discussed above, the AP may process the response(s) using its ML model (e.g., the LLM) in order to evaluate and understand the potential causes and/or solutions for the network issue. In this way, the AP can substantially improve the troubleshooting and management process in the network.

Figure 4:
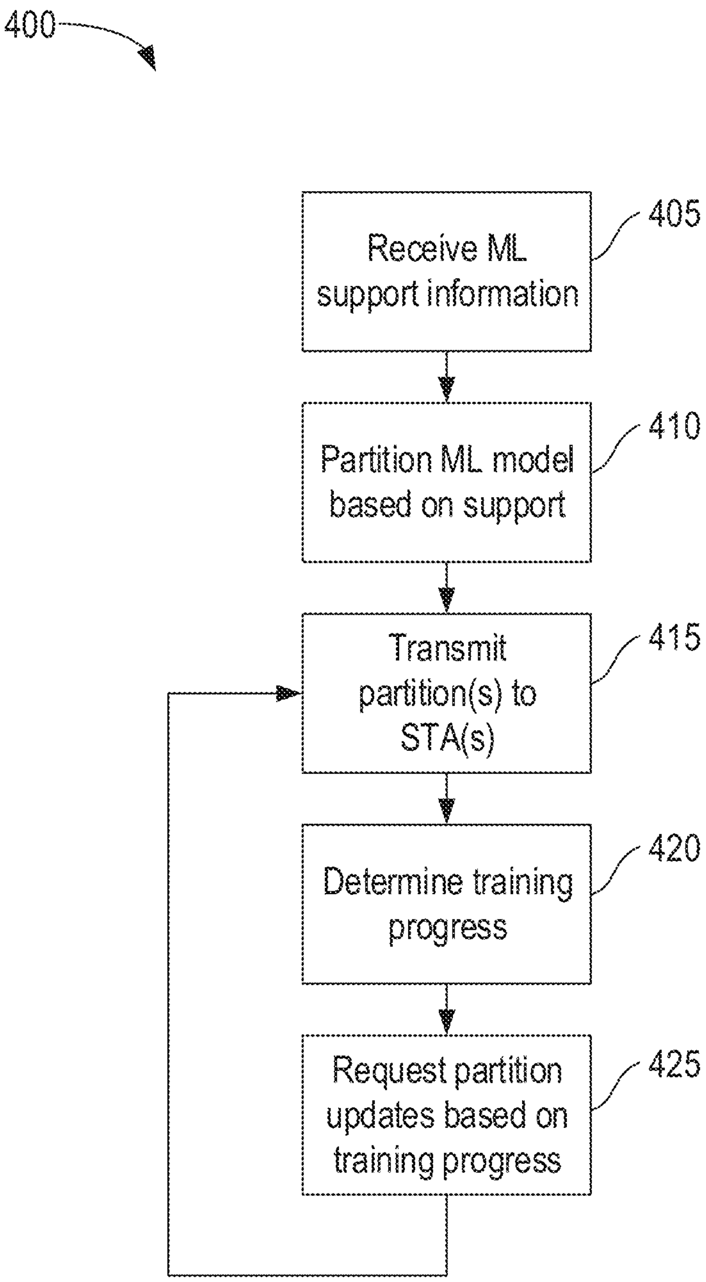
FIG. 4 is a flow diagram depicting an example method for enabling effective federated learning via AP and STA coordination, according to some embodiments of the present disclosure.

FIG. 4 is a flow diagram depicting an example method 400 for enabling effective federated learning via AP and STA coordination, according to some embodiments of the present disclosure. In some embodiments, the method 400 is performed by an AP, such as the AP 105 of FIGS. 1-2.

At block 405, the AP receives ML support information from one or more STAs. For example, as discussed above, the AP may request that each STA, at association, indicate the ML support offered by the STA (e.g., which model(s) the STA hosts or can host, what computing resources are available for federated training of diagnostic models, and the like). For example, in some embodiments, the ML support may indicate the number of neural network layer(s) that the STA has capacity to train, the number of neurons or other neural network units per layer that the STA has capacity to train, the total number of neural network units (across any number of layers) that the STA has capacity to train, and the like.

At block 410, the AP partitions an ML model (e.g., a diagnostic LLM) based on the model support offered by the one or more STA(s). For example, as discussed above, if the ML model is a neural network having a plurality of layers (each having a set of neurons), the AP may partition the network by dividing the layers and/or neurons into subsets, such that each subset or partition can be allocated to one or more STAs for training. In some embodiments, partitioning the model may include defining or modifying the model architecture based on the support. For example, the AP may determine to train a new model having a particular architecture (e.g., a particular number of neurons) based on the support offered by the STA(s) (e.g., such that all or at least a portion of the STAs can host the entire model).

At block 415, the AP transmits the partition(s) to one or more participating STAs. In some embodiments, as discussed above, this may include transmitting one or more partitions to the one or more STAs (e.g., such that some STAs may have the entire model, and some may have one or more subsets of the model). In some embodiments, at block 415, the AP may similarly transmit any relevant hyperparameters or other information used to train the model.

At block 420, the AP can determine training progress of the model. For example, in some embodiments, the AP may periodically query the STAs to determine their progress (e.g., to request information about how many training iterations or epochs have been completed, whether the model has converged, and the like).

At block 425, the AP can request partition updates from one or more STAs based on this progress. For example, the AP may request that one or more STAs provide the updated model partition(s) to the AP (e.g., if the STAs indicate that training has completed or progressed to a defined point), and/or that one or more STAs continue training (e.g., for at least a defined number of epochs or a defined amount of time) prior to providing the updates to the AP. The method 400 then returns to block 415, where the AP can redistribute the updated model partition(s) to participating STAs to continue training.

Figure 5:
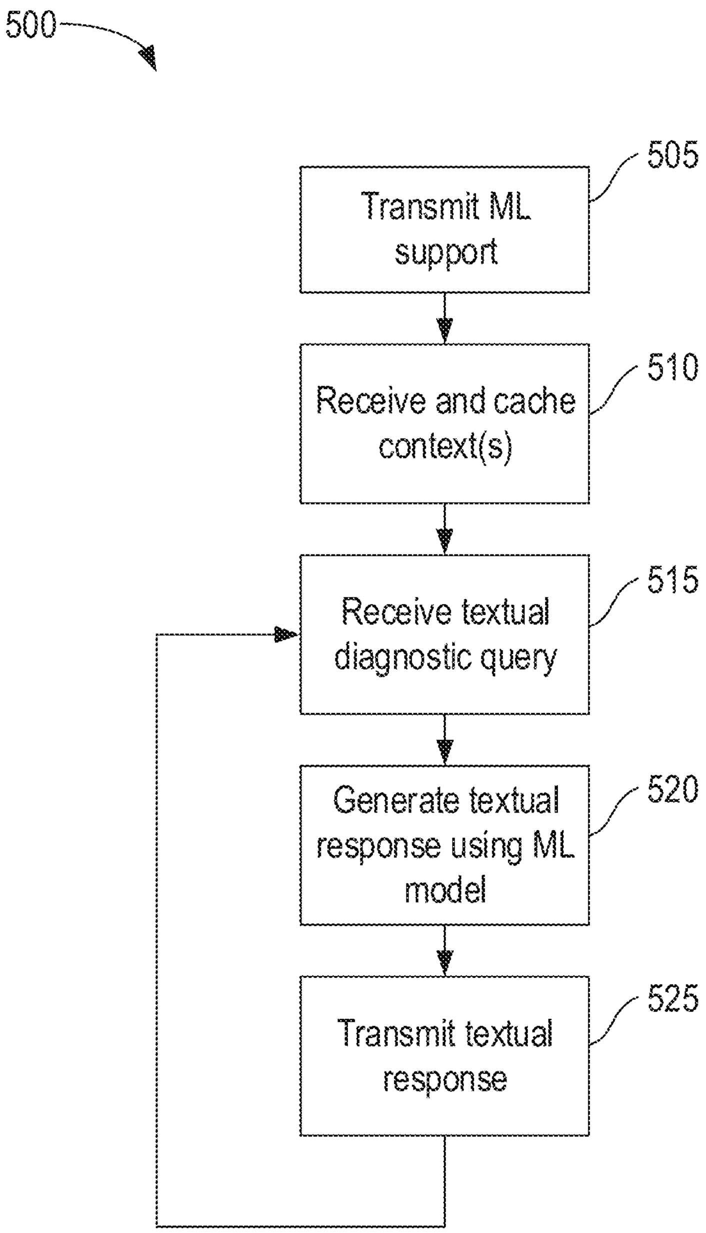
FIG. 5 is a flow diagram depicting an example method for facilitating network management using language models, according to some embodiments of the present disclosure.

FIG. 5 is a flow diagram depicting an example method 500 for facilitating network management using language models, according to some embodiments of the present disclosure. In some aspects, the method 500 is performed by a STA, such as the STA 110 of FIGS. 1-2.

At block 505, the STA transmits an indication of its ML support to one or more APs in a network. In some aspects, as discussed above, the STA transmits the ML support at association time (e.g., as part of, or just after, associating to the AP). In some embodiments, the STA transmits the ML support to the AP in response to a request, from the AP, to indicate such support. As discussed above, the ML support may generally indicate information such as the model(s) hosted by or supported by the STA, the data the model(s) were trained on, the compute resources (e.g., memory and/or processor cores) available for training ML models, and the like.

At block 510, the STA can optionally receive and cache relevant contextual information for common network issues, as discussed above. That is, if the STA has sufficient memory space, the AP may optionally collect and transmit contextual data that may be relevant or useful in responding to future inquiries. In some aspects, as discussed above, the STA may receive this context at association (e.g., as part of, or just after, associating to the AP) and/or shortly after association during a relative quiet time for the AP and/or STA (e.g., when the STA is not receiving or transmitting a substantial amount of data, or otherwise has sufficient capacity to receive and store the context). In some aspects, as discussed above, this contextual information may be provided before the issue(s) arise, which can substantially reduce the latency and overheard consumed by the prompt and response process when the issue(s) actually occur.

At block 515, the STA receives a textual diagnostic query from the AP. That is, after a network issue is detected, the AP may generate and transmit the query to the STA, asking the STA to evaluate and/or provide useful information that may be helpful to solve the issue. In some aspects, if the AP determines that the relevant context for the issue was already provided to the STA, the prompt may be a relatively short string (along with, in some embodiments, an indication that the relevant context is already cached by the STA), rather than a large message that explicitly includes the context. This can reduce the network overhead of the prompt, which may be particularly useful when such issues arise (e.g., because the network capacity may be diminished by the issue itself).

At block 520, the STA generates a textual response to the query using its own local machine learning model, as discussed above. For example, the STA may process the prompt and, in some aspects, context, in order to evaluate the request, identify relevant information to resolve or respond, and generate a textual response including this information. For example, as discussed above, the STA may identify which RF metrics (as perceived by the STA) may be relevant in investigating or solving the indicated issue, and may therefore collect and provide this data to the AP.

At block 525, the STA transmits the textual response (along with any relevant non-textual data, such as RF metrics, as discussed above) to the AP. In this way, the AP and STA can efficiently exchange information without relying on explicit specification as to the data needed. As the STA may be better-situated to determine which information is most relevant or useful for the given problem (as compared to the AP), this approach can therefore substantially improve the process of troubleshooting and management in the network.

Figure 6:
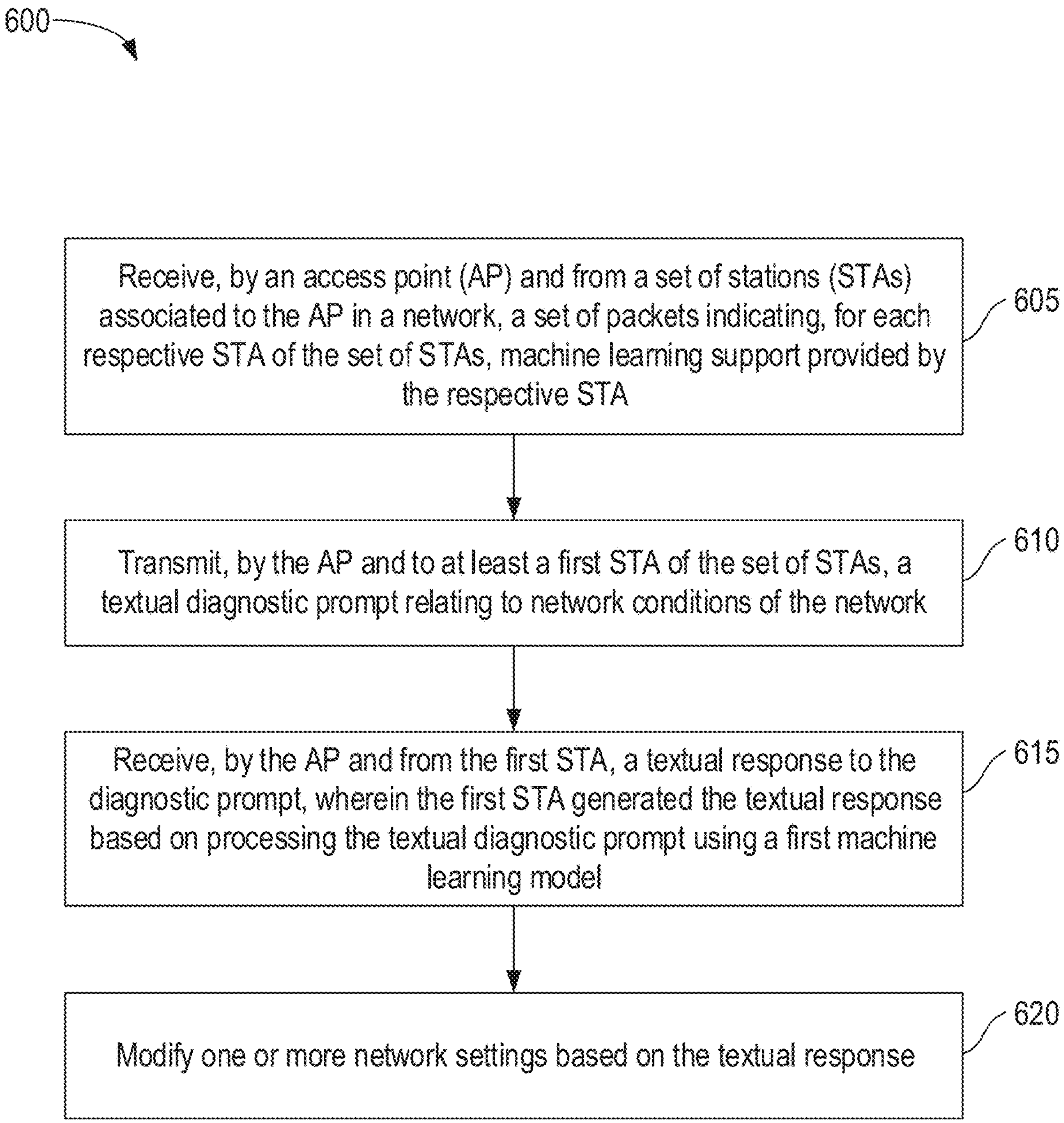
FIG. 6 is a flow diagram depicting an example method for modifying network configurations using machine learning, according to some embodiments of the present disclosure.

FIG. 6 is a flow diagram depicting an example method 600 for modifying network configurations using machine learning, according to some embodiments of the present disclosure. In some embodiments, the method 600 may be performed by an AP, such as the AP 105 of FIGS. 1-2.

At block 605, a set of packets is received indicating, for each respective station (STA) of a set of STAs (e.g., the STAs 110 of FIGS. 1-2) associated to an access point (AP) in a network (e.g., the AP 105 of FIGS. 1-2), machine learning support provided by the respective STA.

At block 610, a textual diagnostic prompt (e.g., the queries 120 of FIG. 1) relating to network conditions of the network is transmitted by the AP and to at least a first STA of the set of STAs.

At block 615, a textual response to the diagnostic prompt (e.g., the responses 125 of FIG. 1) is received by the AP and from the first STA, wherein the first STA generated the textual response based on processing the textual diagnostic prompt using a first machine learning model (e.g., the machine learning models 115 of FIG. 1).

At block 620, one or more network settings are modified based on the textual response.

Figure 7:
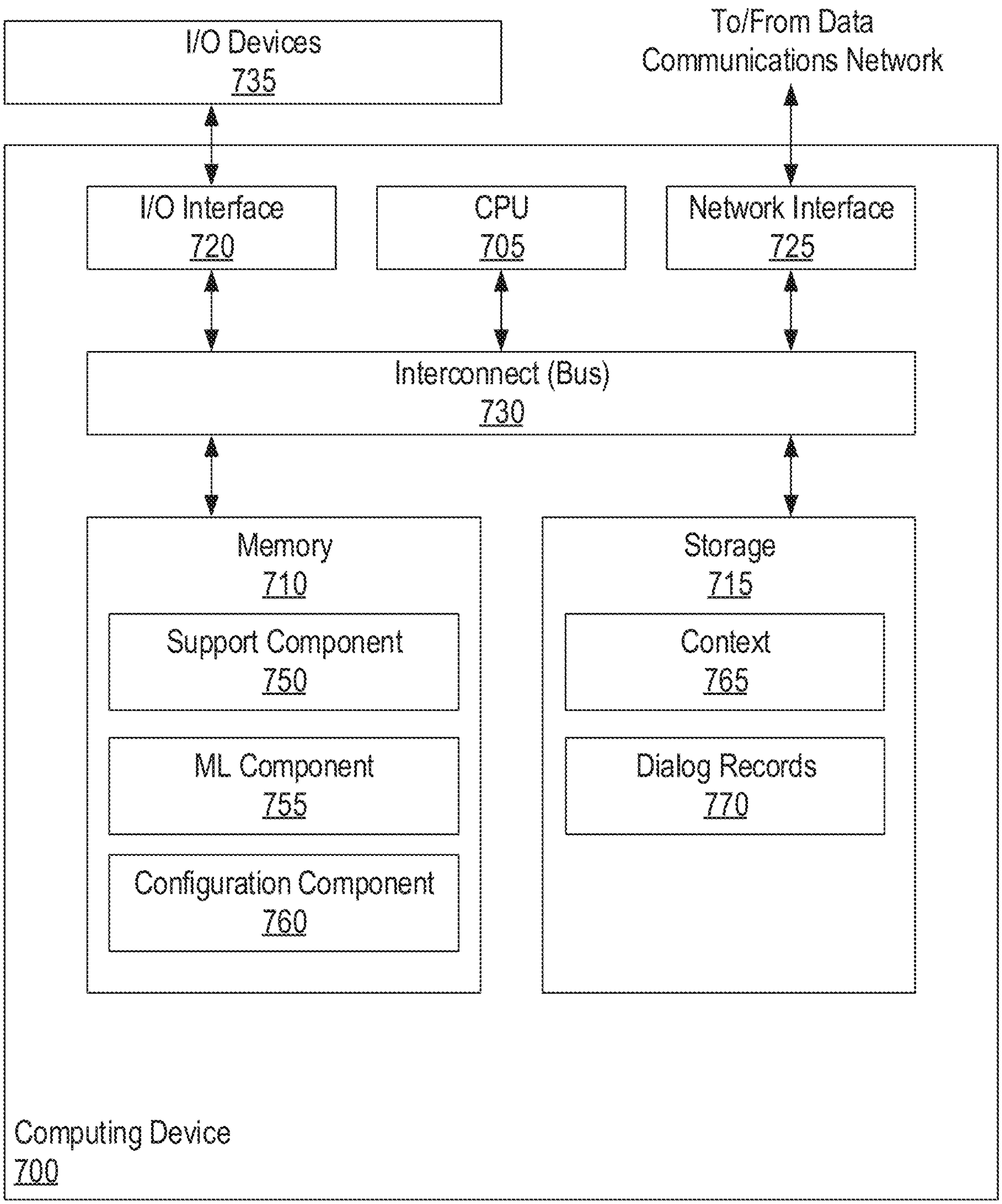
FIG. 7 depicts an example computing device configured to perform various aspects of the present disclosure, according to some embodiments disclosed herein.

FIG. 7 depicts an example computing device 700 configured to perform various aspects of the present disclosure, according to some embodiments disclosed herein. Although depicted as a physical device, in embodiments, the computing device 700 may be implemented using virtual device(s), and/or across a number of devices (e.g., in a cloud environment). In one embodiment, the computing device 700 corresponds to a network device (e.g., a computing system), such as the AP 105 of FIGS. 1-2.

As illustrated, the computing device 700 includes a CPU 705, memory 710, storage 715, a network interface 725, and one or more input/output (I/O) interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a support component 750, an ML component 755, and a configuration component 760, which may perform one or more embodiments discussed above. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In some embodiments, the support component 750 can be used to determine and evaluate ML support offered by associated STAs in a network, as discussed above. For example, the support component 750 may transmit support requests (e.g., requesting information about the support offered by a STA), and/or collect support responses indicating the model(s) supported or used by each STA, the computational resources available on each STA to cache data and/or train models, and the like.

In some embodiments, the ML component 755 can be used to use ML models to generate and evaluate data, as discussed above. For example, the ML component 755 may use ML models to generate textual prompts or queries when network issues arise, and/or may process textual responses using ML models to identify potential causes and/or solutions to the network issues. In some aspects, the ML component 755 may further configure or modify the ML operations of the computing device 700, such as to use a different model depending on the capabilities of the STA(s). Further, in some embodiments, the ML component 755 may mange federated training of ML models using the STAs, as discussed above.

In some embodiments, the configuration component 760 can be used to modify network settings and configurations based on STA responses, as discussed above. For example, the configuration component 760 may update a wide variety of settings in order to mitigate or remediate the issues, based on information gleaned from STA responses.

In the illustrated example, the storage 715 includes context 765 and dialog records 770. Although depicted as residing in storage 715, the depicted data may be stored in any suitable location, including memory 710. The context 765 may generally correspond to any contextual information that may be relevant or useful in diagnosing and/or correcting network issues. For example, the context 765 may include the current network configurations and status. In some embodiments, as discussed above, some or all of the context 765 may be pre-cached by one or more STAs to assist in rapid issue remediation. The dialog records 770 are generally representative of prior prompts and/or responses (and, in some aspects, corresponding remediation actions that were performed) that the computing device 700 has used to remedy previous issues. For example, if a given textual prompt to a given STA resulted in the STA returning useful information that allowed the issue to be corrected or otherwise allowed network conditions to be improved (e.g., through reduced congestion, improved signal strength, improved throughput, and the like), the computing device 700 may store a dialog record 770 indicating that the particular prompt solved the problem. When the same (or a similar) problem arises in the future, the ML component 755 may determine to use the same (or a similar) prompt.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

receiving, by an access point (AP) and from a set of stations (STAs) associated to the AP in a network, a set of packets indicating, for each respective STA of the set of STAs, machine learning support provided by the respective STA;

transmitting, by the AP and to at least a first STA of the set of STAs, a textual diagnostic prompt relating to network conditions of the network;

receiving, by the AP and from the first STA, a textual response to the diagnostic prompt, wherein the first STA generated the textual response based on processing the textual diagnostic prompt using a first machine learning model; and modifying one or more network settings based on the textual response.

2. The method of claim 1, further comprising:

selecting a subset of STAs, from the set of STAs based at least in part on the machine learning support provided by the subset of STAs;

transmitting, to each respective STA of the subset of STAs, a respective textual diagnostic prompt; and receiving, from each respective STA of the subset of STAs, a respective textual response to the diagnostic prompt; and modifying the one or more network settings based further on the respective textual responses.

3. The method of claim 1, further comprising:

determining a set of differences between the first machine learning model used by the first STA and a second machine learning model used by the AP; and accessing, by the AP, a new machine learning model based on the set of differences.

4. The method of claim 1, further comprising storing, by the AP, an indication that the textual diagnostic prompt resulted in the textual response and that the modifications to the one or more network settings based on the textual response improved network conditions.

5. The method of claim 1, further comprising selecting, by the AP, the textual diagnostic prompt based on a stored record indicating that the textual diagnostic prompt previously resulted in a prior textual response and that prior modifications to the one or more network settings based on the prior textual response improved network conditions.

6. The method of claim 5, further comprising selecting, by the AP, a second textual diagnostic prompt for a second STA of the set of STAs based on a second stored record indicating that the second textual diagnostic prompt previously resulted in a second prior textual response and that prior modifications to the one or more network settings based on the second prior textual response improved network conditions.

7. The method of claim 1, further comprising:

prior to transmitting the textual diagnostic prompt, determining a set of common network issues for the network;

identifying a set of contextual data relevant to a first common network issue of the set of common network issues; and transmitting, to the first STA, the set of contextual data, wherein the first STA caches the set of contextual data to facilitate future responses.

8. The method of claim 7, further comprising:

determining that the set of contextual data is no longer relevant to the first common network issue; and transmitting, to the first STA, a suggestion to uncache the set of contextual data.

9. The method of claim 1, further comprising:

determining to jointly train a diagnostic machine learning model, wherein the respective machine learning support provided by each respective STA of the set of STAs indicates a number of neural network units the respective STA can support;

partitioning the diagnostic machine learning model based on the respective machine learning support provided by each respective STA of the set of STAs; and transmitting one or more partitions of the diagnostic machine learning model to each STA of the set of STAs.

10. The method of claim 9, further comprising:
transmitting, by the AP and to each STA of the set of STAs, a training update report;
receiving, by the AP and from each respective STA of the set of STAs, a response indicating training progress; and
requesting, by the AP, updated model data for the diagnostic machine learning model from at least a subset of the set of STAs based on the training progresses.

11. A system, comprising:
one or more memories collectively or individually comprising computer-executable instructions; and
one or more processors configured to, individually or collectively, execute the computer-executable instructions and cause the system to perform an operation comprising:
receiving, by an access point (AP) and from a set of stations (STAs) associated to the AP in a network, a set of packets indicating, for each respective STA of the set of STAs, machine learning support provided by the respective STA;
transmitting, by the AP and to at least a first STA of the set of STAs, a textual diagnostic prompt relating to network conditions of the network;
receiving, by the AP and from the first STA, a textual response to the diagnostic prompt, wherein the first STA generated the textual response based on processing the textual diagnostic prompt using a first machine learning model; and
modifying one or more network settings based on the textual response.

12. The system of claim 11, the operation further comprising:
selecting a subset of STAs, from the set of STAs based at least in part on the machine learning support provided by the subset of STAs;
transmitting, to each respective STA of the subset of STAs, a respective textual diagnostic prompt; and
receiving, from each respective STA of the subset of STAs, a respective textual response to the diagnostic prompt; and
modifying the one or more network settings based further on the respective textual responses.

13. The system of claim 11, the operation further comprising:
prior to transmitting the textual diagnostic prompt, determining a set of common network issues for the network;
identifying a set of contextual data relevant to a first common network issue of the set of common network issues; and
transmitting, to the first STA, the set of contextual data, wherein the first STA caches the set of contextual data to facilitate future responses.

14. The system of claim 11, the operation further comprising storing, by the AP, an indication that the textual diagnostic prompt resulted in the textual response and that the modifications to the one or more network settings based on the textual response improved network conditions.

15. The system of claim 11, the operation further comprising:
determining to jointly train a diagnostic machine learning model, wherein the respective machine learning support provided by each respective STA of the set of STAs indicates a number of neural network units the respective STA can support;
partitioning the diagnostic machine learning model based on the respective machine learning support provided by each respective STA of the set of STAs; and
transmitting one or more partitions of the diagnostic machine learning model to each STA of the set of STAs.

16. One or more non-transitory computer-readable media collectively or individually comprising computer-executable instructions that, when executed by one or more processors of one or more processing systems, cause the one or more processing systems to collectively or individually perform an operation comprising:
receiving, by an access point (AP) and from a set of stations (STAs) associated to the AP in a network, a set of packets indicating, for each respective STA of the set of STAs, machine learning support provided by the respective STA;
transmitting, by the AP and to at least a first STA of the set of STAs, a textual diagnostic prompt relating to network conditions of the network;
receiving, by the AP and from the first STA, a textual response to the diagnostic prompt, wherein the first STA generated the textual response based on processing the textual diagnostic prompt using a first machine learning model; and
modifying one or more network settings based on the textual response.

17. The one or more non-transitory computer-readable media of claim 16, the operation further comprising:
selecting a subset of STAs, from the set of STAs based at least in part on the machine learning support provided by the subset of STAs;
transmitting, to each respective STA of the subset of STAs, a respective textual diagnostic prompt; and
receiving, from each respective STA of the subset of STAs, a respective textual response to the diagnostic prompt; and
modifying the one or more network settings based further on the respective textual responses.

18. The one or more non-transitory computer-readable media of claim 16, the operation further comprising:
prior to transmitting the textual diagnostic prompt, determining a set of common network issues for the network;
identifying a set of contextual data relevant to a first common network issue of the set of common network issues; and
transmitting, to the first STA, the set of contextual data, wherein the first STA caches the set of contextual data to facilitate future responses.

19. The one or more non-transitory computer-readable media of claim 16, further comprising storing, by the AP, an indication that the textual diagnostic prompt resulted in the textual response and that the modifications to the one or more network settings based on the textual response improved network conditions.

20. The one or more non-transitory computer-readable media of claim 16, the operation further comprising:
determining to jointly train a diagnostic machine learning model, wherein the respective machine learning support provided by each respective STA of the set of STAs indicates a number of neural network units the respective STA can support;
partitioning the diagnostic machine learning model based on the respective machine learning support provided by each respective STA of the set of STAs; and transmitting one or more partitions of the diagnostic machine learning model to each STA of the set of STAs.

* * * * *